United States Patent
Pond et al.

(10) Patent No.: US 7,055,996 B2
(45) Date of Patent: Jun. 6, 2006

(54) SIDE TURN/MARKER LAMP

(75) Inventors: Greg Pond, Jamestown, NY (US); Todd Kolstee, North Clymer, NY (US); Philip Roller, Ashville, NY (US)

(73) Assignee: Truck-Lite Co., Inc., Falconer, NY (US)

(*) Notice: Subject to any disclaimer, the term of this patent is extended or adjusted under 35 U.S.C. 154(b) by 150 days.

(21) Appl. No.: 10/392,068

(22) Filed: Mar. 19, 2003

(65) Prior Publication Data

US 2003/0179584 A1 Sep. 25, 2003

Related U.S. Application Data

(60) Provisional application No. 60/366,099, filed on Mar. 19, 2002.

(51) Int. Cl.
*B60Q 1/56* (2006.01)

(52) U.S. Cl. .................... 362/498; 362/485; 362/496; 362/544; 362/545; 362/516; 362/243

(58) Field of Classification Search ............... 362/485, 362/496, 543, 544, 545, 516, 518, 520, 522, 362/228, 242, 243, 244, 245, 247, 498
See application file for complete search history.

(56) References Cited

U.S. PATENT DOCUMENTS

| | | | |
|---|---|---|---|
| 4,862,330 A | 8/1989 | Machida et al. ............... 362/61 |
| 4,972,302 A | 11/1990 | Masuyama et al. ........... 362/61 |
| 5,093,768 A | 3/1992 | Ohe ............................ 362/241 |
| 5,515,253 A * | 5/1996 | Sjoborn ....................... 362/244 |
| 5,944,415 A | 8/1999 | Kurita et al. ................ 362/518 |
| 6,095,663 A * | 8/2000 | Pond et al. .................. 362/247 |
| 6,280,480 B1 | 8/2001 | Tuttle et al. ................. 632/518 |
| 6,491,417 B1 * | 12/2002 | Haen et al. .................. 362/485 |
| 6,530,683 B1 * | 3/2003 | Ohkohdo et al. ............ 362/511 |
| 6,533,445 B1 * | 3/2003 | Rogers ........................ 362/540 |
| 6,612,728 B1 * | 9/2003 | Roller et al. ................. 362/521 |
| 6,672,745 B1 * | 1/2004 | Bauer et al. ................. 362/545 |
| 6,752,515 B1 * | 6/2004 | Evans et al. ................. 362/184 |
| 2002/0067548 A1 * | 6/2002 | TerHovhannisian ......... 359/627 |

* cited by examiner

*Primary Examiner*—John Anthony Ward
*Assistant Examiner*—Jacob Y. Choi
(74) *Attorney, Agent, or Firm*—The Bilicki Law Firm P.C.

(57) ABSTRACT

A lamp comprising a housing, at least one planar substrate supporting a plurality of light sources, and a light directing member comprising a plurality of reflective surfaces. Each of the reflective surfaces is generally parabolic and reflects light emitted from the plurality of light sources. A lamp comprising a housing, at least one planar substrate, a plurality of light sources supported by each planar substrate, a lens, and a light directing member that reflects light emitted from the plurality of light sources. The light directing member produces a light distribution pattern spanning substantially five degrees to substantially ninety degrees in one direction along the longitudinal axis of said lamp.

24 Claims, 11 Drawing Sheets

SIDE TURN/MARKER LAMP

PRIORITY CLAIM

The present application claims priority to U.S. Provisional Patent Application Ser. No. 60/366,099 filed Mar. 19, 2002, which is incorporated by reference herein.

BACKGROUND

The Society of Automotive Engineers (hereinafter "SAE") publishes many new, revised and reaffirmed standards each year in three categories, including Ground Vehicle Standards, which are also referred to as the J-Standards. Information on these standards is available on the World Wide Web at the SAE website.

The SAE standards specify certain photometric requirements for vehicle lamps including candela requirements and locations from which the requirements are measured. SAE standard J2039 (May 2001) is the current standard for side turn signal lamps for long vehicles. SAE standard J592 (August 2000) is the current SAE standard for clearance, side marker, and identification lamps. The Department of Transportation (DOT), however, in its Federal Motor Vehicle Safety Standards, 49 C.F.R. §571.108 (2000), ("FMVSS 108") has adopted SAE Standard J592e (1972) for clearance, side marker, and identification lamps.

J2039 standard defines a side turn lamp as the signaling element of a turn signal system, which indicates a change in vehicle direction by giving a flashing light on the side toward which the turn or lane change will be made. J2039 provides test procedures, requirements and guidelines for side turn signal lamps intended for use in trailers 12 meters or more in overall length. The side turn signals may also be used on other large vehicles such as trucks, truck tractors, buses and any other application where this type of lighting is desired.

A turn, or directional, signal lamp should be visible, if possible, from any point with respect to the vehicle. Moreover, to be considered visible, the lamp should provide a minimum of 13 cm$^2$ of unobstructed projected area when the light emitting surface of the lens is projected parallel to a horizontal plane in any direction from 0 degrees to 85 degrees right for curbside lamp and to a vertical place in any direction from 35 degrees above to 20 degrees below the horizontal with respect to the lamp H-V axis. This is difficult to accomplish in a large vehicle. Therefore, a separate turn signal is usually mounted on both the road side of the truck and the curb side of the truck. The term road side is used to refer to the driver side of the vehicle and the term curb side is used to mean the passenger side of the vehicle. Specifically, the side turn lamp is mounted behind the front wheel on the road side and the curb side of the vehicle to supplement the forward turn signal lamp.

SAE J592 (August 2000) and SAE Standard J592e (1972), which relate to sidemarker lamps, defines a sidemarker lamp as a lighting device used to indicate the presence of and length of the vehicle when viewed from the side. J592 provides test procedures, requirements and guidelines for sidemarker lamps intended for use on road vehicles less than 2032 mm in overall width.

Reprinted hereinbelow are the photometric performance requirements for side turn lamps, as recited in Table 1 of J2039, and the photometric performance requirements for sidemarker lamps, as recited in Table 1 of J592e. The entirety of SAE Standard J2039 (May 2001), SAE Standard J592 (August 2000), SAE Standard J592e (1972), and DOT Standard 592e (part of FMVSS 108) are incorporated herein by reference.

TABLE 1

SIDE TURN SIGNAL LAMP PHOTOMETRIC PERFORMANCE REQUIREMENTS[1]

| Zone | Curbside Lamps[2] (Right Hand) Test Point Degrees | Minimum Luminous Intensity Candela[3] | Zone Total Luminous Intensity, Candela[4] |
|---|---|---|---|
| 1 | 35U-45R | 12 | 96 |
|  | -30R | 12 |  |
|  | 20U-60R | 20 |  |
|  | 10D-60R | 20 |  |
|  | 15D-45R | 16 |  |
|  | 20D-30R | 16 |  |
| 2 | 35U-V | 12 | 98 |
|  | H-30R | 40 |  |
|  | H-V | 30 |  |
|  | 20D-V | 16 |  |
| 3 | 20U-75R | 20 | 120 |
|  | H-45R | 50 |  |
|  | H-85R | 30 |  |
|  | 5D-75R | 20 |  |
| Maximum Luminous Intensity, Candela[5] (within the photometric pattern) |  |  | 200 |
| Maximum Luminous Intensity, Candela[5,6] | 85L-90L H and above | 50 |  |

[1] Ratio Requirements of 6.1.5..2 apply.
[2] This table shows the zone totals for the curbside lamp requirements. The roadside lamp zone total requirements are symmetrically opposite.
[3] The measured values at each individual test point shall not be less than 60% of the required minimum value shown for that individual test point location.
[4] The sum of the luminous intensity measurements at each test point within a zone shall not be less than the Zone Total Luminous Intensity shown.

TABLE 1-continued

SIDE TURN SIGNAL LAMP PHOTOMETRIC PERFORMANCE REQUIREMENTS[1]

| Zone | Curbside Lamps[2] (Right Hand) Test Point Degrees | Minimum Luminous Intensity Candela[3] | Zone Total Luminous Intensity, Candela[4] |
|---|---|---|---|

[5]The listed maximum shall not be exceeded over any area larger than that generated by a 0.5 degree radius within the solid angle defined by the test points.
[6]The forward maximum intensity applies throughout the zone of 85 degrees left to 90 degrees left and horizontal and above.

TABLE 2

CLEARANCE, SIDE MARKER, AND IDENTIFICATION LAMPS-PHOTOMETRIC REQUIREMENTS SAE J592e[1]

| Zone | Test Points (degrees) | | Minimum Luminous Intensity (cd)[2] Red | Minimum Luminous Intensity (cd)[2] Yellow | Minimum Luminous Intensity (cd)[3] Red | Zone Total Luminous Intensity (cd)[3] Yellow |
|---|---|---|---|---|---|---|
| I | 10U | | 0.25 | 0.62 | 0.75 | 1.86 |
|   | H | 45L | 0.25 | 0.62 | | |
|   | 10D | | 0.25 | 0.62 | | |
| II | 10U | | 0.25 | 0.62 | 0.75 | 1.86 |
|   | H | V | 0.25 | 0.62 | | |
|   | 10D | | 0.25 | 0.62 | | |
| III | 10U | | 0.25 | 0.62 | 0.75 | 1.86 |
|   | H | 45R | 0.25 | 0.62 | | |
|   | 10D | | 0.25 | 0.62 | | |

Maximum Luminous Intensity (cd)
[1]Reduced inboard angle requirement of 6. 1. 5. 2. Apply.
[2]The measured values at each individual test point shall not be less then 60% of the required minimum value shown for that individual test point location.
[3]The sum of the luminous intensity measurements at each test point within a zone shall not be less than the Zone Total Luminous Intensity shown.

BRIEF DESCRIPTION OF THE DRAWINGS

FIG. 12b is a perspective view of the alternative embodiment of the side turn/marker lamp of FIG. 12a.

DETAILED DESCRIPTION OF EMBODIMENTS OF THE INVENTION

For the purpose of promoting an understanding of the present invention, references are made in the text hereof to embodiments of a combined side turn/marker vehicular lamp, some of which are depicted in the drawings. It should nevertheless be understood that no limitations on the scope of the invention are thereby intended. One of ordinary skill in the art will readily appreciate that modifications such as those involving the type of LED, number of LEDs, geometry of the lamp, shape of the lens, and type and placement of optical elements of the lens, do not depart from the spirit and scope of the present invention. Some of these possible modifications are mentioned in the following description. In addition, in the embodiments depicted herein, like reference numerals refer to identical structural elements in the various drawings.

Moreover, the term "substantially" or "approximately" as used herein may be applied to modify any quantitative representation that could permissibly vary without resulting in a change in the basic function to which it is related. For example, a side turn/marker lamp as disclosed herein as having a substantially oval shape might permissibly have a somewhat non-oval shape within the scope of the invention if its capability of functioning as a side turn/marker lamp is not materially altered.

Figure 1:
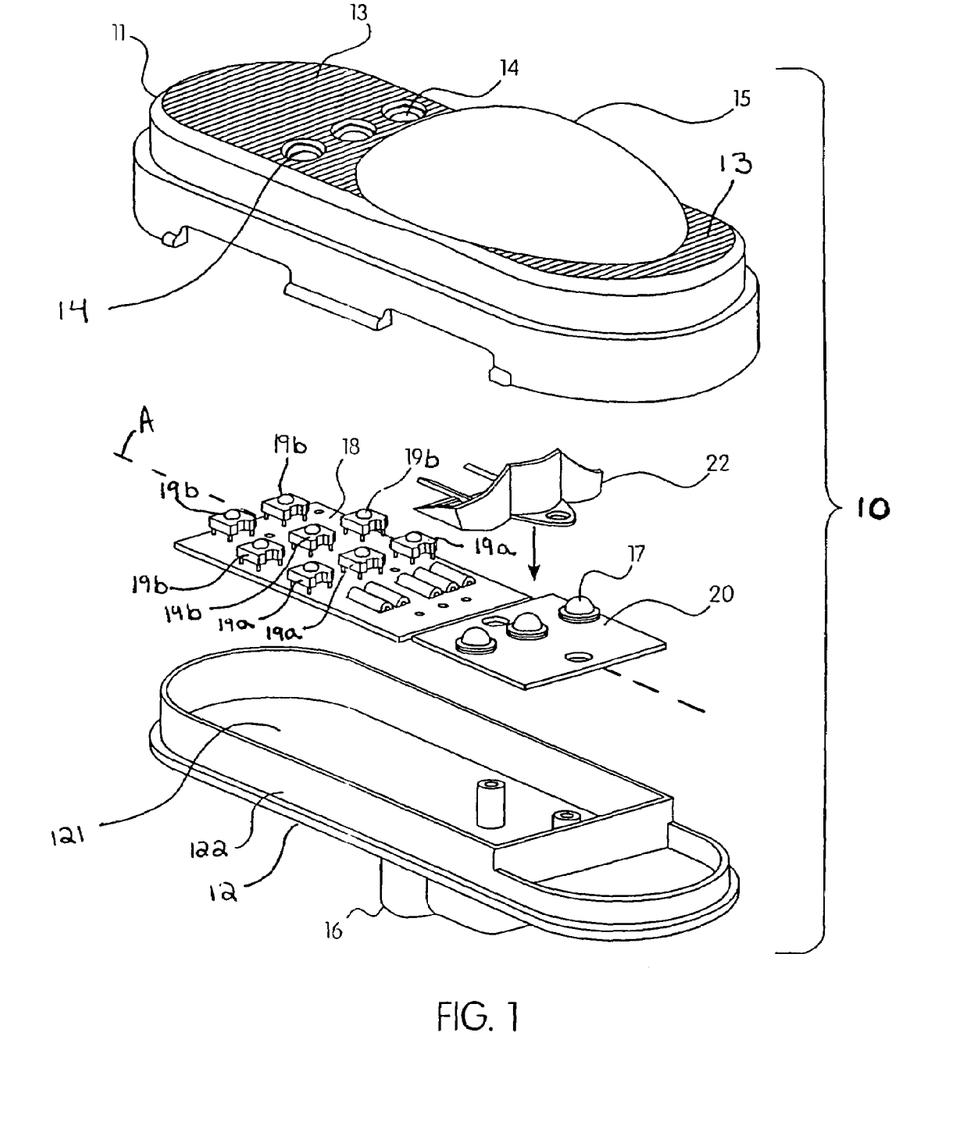
FIG. 1 is an exploded assembly view of one embodiment of the combined side turn/marker lamp.

FIG. 1 illustrates an exploded assembly perspective view of one embodiment of lamp 10 generally symmetrical about axis of symmetry A. In the embodiment shown here, lamp 10 functions as a combined side turn/marker lamp for a vehicle. Lamp 10 is shown to include housing 12, lens 11, light directing member 22, first substrate 20, and second substrate 18. Housing 12 is comprised of base 121 and side 122. In the embodiment shown, first substrate 20 and second substrate 18 are circuit boards. First substrate 20 and second substrate 18 are adapted to engage with housing 12. For example, the circuit boards are secured to base 121 of housing 12 with epoxy potting. However, one of ordinary skill in the art will readily appreciate that the first and second substrates 20 and 18 may be secured to housing 12 by any suitable means.

In the embodiment shown, a first plurality of LEDs 17 are supported by first substrate 20. A second plurality of LEDs 19a and 19b are supported by second substrate 18. For example, and more specifically, the embodiment shown comprises three (3) LEDs 17 mounted in a line on first substrate 20 perpendicular to axis of symmetry A, three (3) LEDs 19a mounted on second substrate 18, also in a line perpendicular to axis of symmetry A, and five (5) LEDs 19b mounted on second substrate 18. However, one of ordinary skill in the art will recognize that LEDs 17, 19a, and 19b can be arranged in a variety of patterns. One of ordinary skill in the art will readily appreciate that different numbers of LEDs can be placed on first substrate 20 and second substrate 18 in order to construct alternate embodiments of the present invention. Moreover, one of ordinary skill in the art will further appreciate that only one substrate, or more than two substrates, can be used in constructing further alternate embodiments of the present invention.

Figure 2:
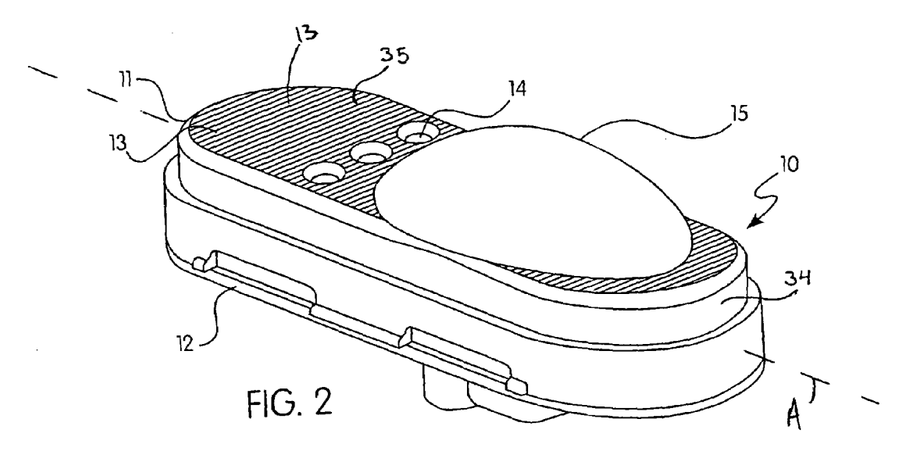
FIG. 2 is a perspective top view of one embodiment of the combined side turn/marker lamp as assembled.

FIG. 2 is a perspective top view of the embodiment of lamp 10 of FIG. 1 when fully assembled. As shown in FIG. 2, lens 11 has side portion 34 and front wall 35. Lens 11 is adapted to engage with housing 12. For example, side portion 34 can be hermetically sealed to housing 12 to protect lamp 10 against entry of dirt and contaminants. In an alternate embodiment, side portion 34 of lens 11 can be removably secured to housing 12. In the embodiment shown, housing 12 is made from a polycarbonate material. One of ordinary skill in the art will readily appreciate, however, that other materials, including but not limited to acrylic, can be used for housing 12. The coloring of housing 12 may vary. For example, in the embodiment shown here, housing 12 is transparent and tinted amber. However, in alternative embodiments, housing 12 can be translucent or colorless and/or using colored LEDs, 19a, and 19b, as described in greater detail infra.

As illustrated in FIGS. 1–2, a plurality of Fresnel rings 14, a plurality of wedge prisms 13 and aspheric convex portion 15 are integrally formed on front wall 35 of lens 11. More specifically, three (3) Fresnel rings 14 are arranged in linear orientation on front wall 35 and perpendicular to axis of symmetry A, adjacent to convex portion 15. As further shown in FIGS. 1–2, the remainder of front wall 35 has wedge prisms 13 vertically aligned such that Fresnel rings 14, wedge prisms 13 and aspheric convex portion 15 collectively cover the entire front wall 35. Although not shown here, wedge prisms 13 and Fresnel rings are internal optics formed on the inside face of front wall 35 (see FIGS. 7–8).

In the embodiment shown in FIG. 2, lens 11 is a one-piece, transparent polycarbonate molding. To allow lamp 10 to function as a side turn/marker lamp, lens 11 is tinted amber. In alternate embodiments, alternate different colors of polycarbonate can be employed, such as red or clear. Moreover, lens 11 could be made from other materials, such as glass. However, one of ordinary skill in the art should readily appreciate that, due to changes in the angle of refraction of glass, the angle and configuration of the optics will differ if glass is used as the material for lens 11 (rather than polycarbonate).

Figure 3A:
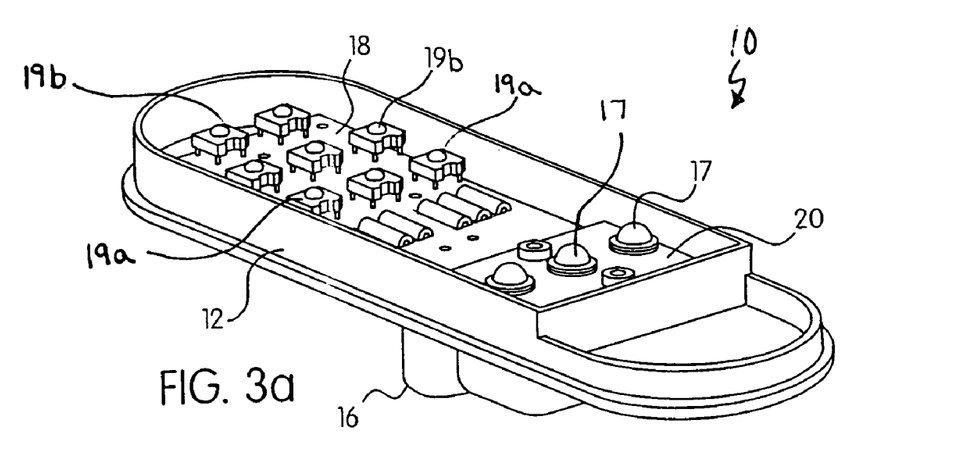
FIG. 3a is a perspective top view of one embodiment of the side turn/marker lamp with the lens removed and the light directing member removed.
Figure 3B:
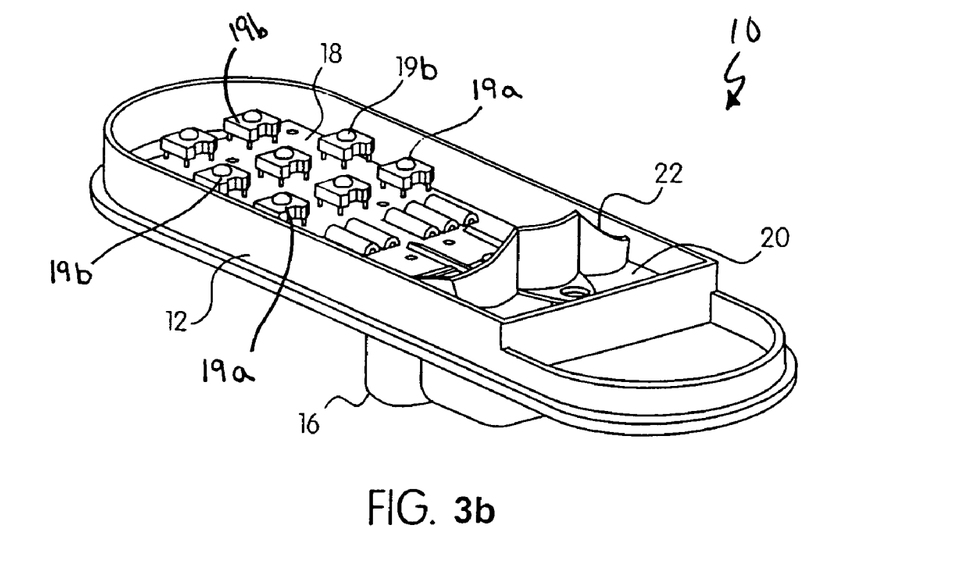
FIG. 3b is a perspective top view of the same embodiment of the side turn/marker lamp as in FIG. 3a, but without the lens, but including the light directing member.

FIGS. 3a and 3b show a perspective top view of one embodiment of lamp 10 (without lens 11), with and without light directing member 22, respectively. Referring to FIG. 3a, first substrate 20 and second substrate 18 are adapted to engage with housing 12 as described supra. Also as described supra, three (3) LEDs 17 (not visible in FIG. 3b) are mounted to first substrate 20 and first substrate 20 is a circuit board. As further described supra, three (3) LEDs 19a and five (5) LEDs 19b are mounted to second substrate 18 and second substrate 18 is a circuit board.

Referring further to FIGS. 3a–3b, in the embodiment of the invention shown, first substrate 20 is further constructed of a material with heat sink properties. As used herein, a material with heat sink properties is any material that absorbs heat generated by the LEDs and thereby dissipates heat away from LEDs 17, 19a, and 19b. For example, in the embodiment shown in FIGS. 1–3b, first substrate 20 and second substrate 18 are a circuit board containing an aluminum core. In another embodiment, first substrate 20 and second substrate 18 are made of any material known by one of ordinary skill in the art for constructing circuit boards, but aluminum posts are mounted in close proximity to LEDs 17 and LEDs 19a and 19b, respectively, to achieve substantially the same heat sinking function. One specific alternate example of a material that circuit boards 18 and 20 can be made of is fiberglass.

FIGS. 3a–3b further illustrates power input module 16 molded in housing 12 and adapted to connect lamp 10 into a vehicle's electrical system. Referring further to FIGS. 3a–3b, housing 12 can serve as a potting tub for lamp 10. For example, in the embodiment shown, LEDs 17, 19a, and 19b and circuit boards 20 and 18 are potted with epoxy. One of ordinary skill in the art will readily appreciate that other potting materials, including but not limited to, urethane or silicone, can be used. This potting protects the component from shock, vibrations, humidity, and dust, while also serving as an additional heat sink.

Figure 4A:
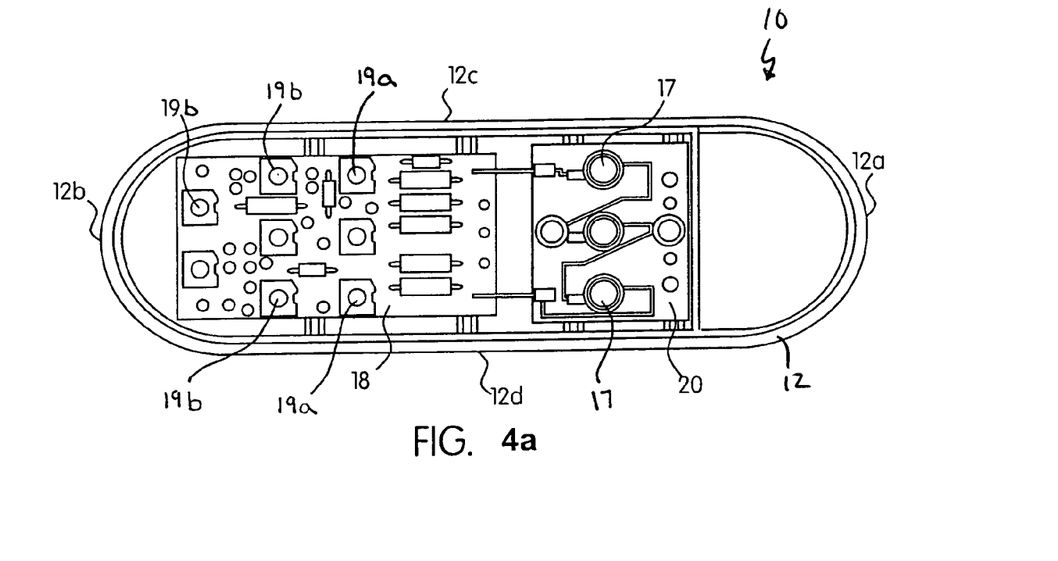
FIG. 4a is a top view of the same embodiment of the side turn/marker lamp as shown in FIGS. 3a and 3b, but with the lens removed and the light directing member removed.
Figure 4B:
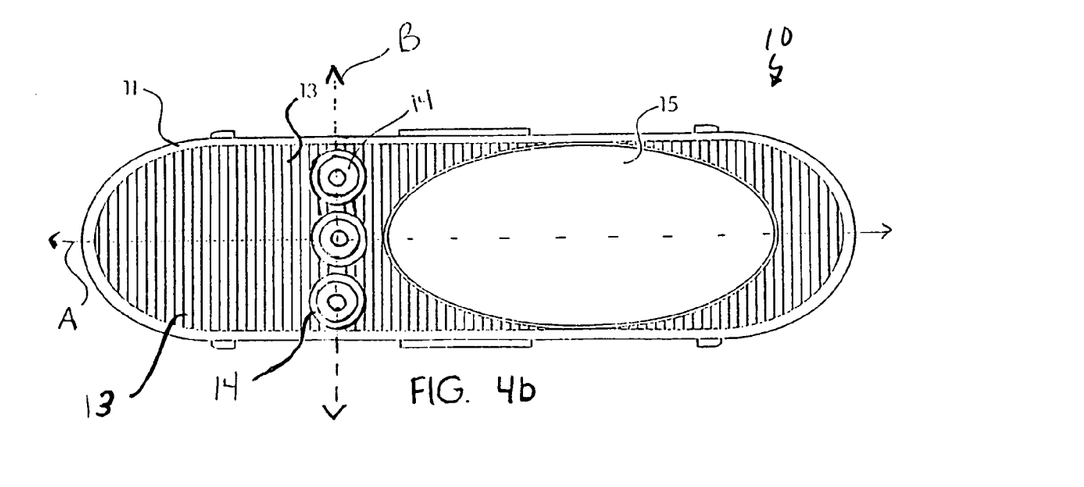
FIG. 4b is a top view of one embodiment of the side turn/marker lamp with the lens.

FIG. 4a is a top plan view of the same embodiment of lamp 10 as shown in FIGS. 3a and 3b, with the lens and the light directing member removed. FIG. 4b is a top plan view of the same embodiment of lamp 10 as shown in FIG. 4a, as assembled, but with lens 11. In FIGS. 4a–4b, lens 11 and housing 12 are shown to be substantially oval-shaped to allow lamp 10 to function as one type of side turn/marker vehicular lamp. As shown here, housing 12 has front portion 12a, back portion 12b, top portion 12c, and bottom portion 12d. FIG. 4b further illustrates axis of symmetry A and line B.

Referring to FIG. 4a, LEDs 17, supported by first substrate 20, are high flux LEDs. As used herein, a high flux LED is an LED capable of producing a minimum flux of approximately 10 Lumens. In this embodiment, the Luxeon™ LED manufactured by LumiLeds is used. However, one of ordinary skill in the art will readily appreciate that other LEDs capable of producing a minimum flux of approximately 10 Lumens can be used as the light source. LEDs 19a–19b, supported by second substrate 18, are low flux LEDs. As used herein, a low flux LED is an LED capable of producing a minimum flux of approximately 0.1 Lumens. In the embodiment shown here, the SuperFlux™ LED manufactured by Hewlett Packard is used. However, one of ordinary skill in the art will readily appreciate that other LEDs capable of producing a minimum flux of approximately 0.1 lumens can be used as a light source.

Moreover, the combination of three (3) high flux and eight (8) low flux LEDs is not intended as a limitation of the invention since one of ordinary skill in the art should readily appreciate that the number and combinations of LEDs 17, 19a, and 19b can varied in order to produce alternate embodiments of the invention. For example, in one alternative embodiment, instead of using eight low flux LEDs, a single high flux LED could be used as light source. However, because low flux LEDs use less current than high flux LEDs, the use of low flux LEDs will produce a lower operating temperature and, therefore, greater efficiency.

Figure 5:
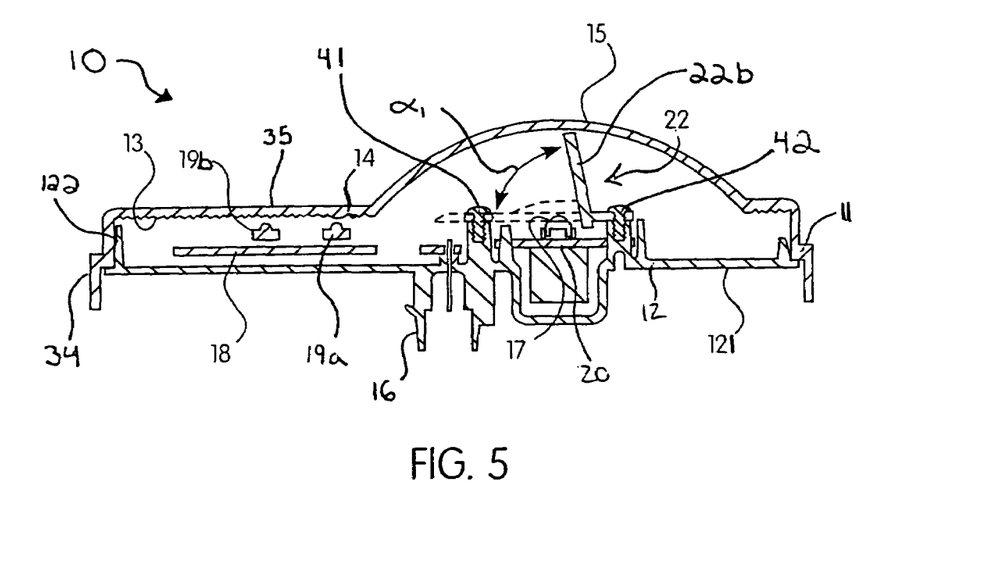
FIG. 5 is a horizontal cross-sectional view of one embodiment of the combined side turn/marker lamp.

FIG. 5 illustrates a cross-sectional view of one embodiment of lamp 10 along axis of symmetry A (as shown in FIGS. 4a–4b). Lamp 10 is shown to include housing 12, lens 11, light directing member 22, first substrate 20, second substrate 18, LEDs 17, and LEDs 19a–19b. Light directing member 22 is adapted to be secured within housing 12. For example, in this embodiment, light directing member 22 is removably secured to housing 12 by screw 41 and screw 42. However, one of ordinary skill in the art will readily appreciate that light directing member 22 can be secured directly to first substrate 20 by any suitable means.

Referring to FIG. 1 and FIG. 5, when lamp 10 is assembled, light directing member 22 is disposed under convex portion 15. In addition, when lamp 10 is assembled, LEDs 17 are also disposed under convex portion 15 and LEDs 19a are disposed directly under each of Fresnel rings 14.

Figure 6A:
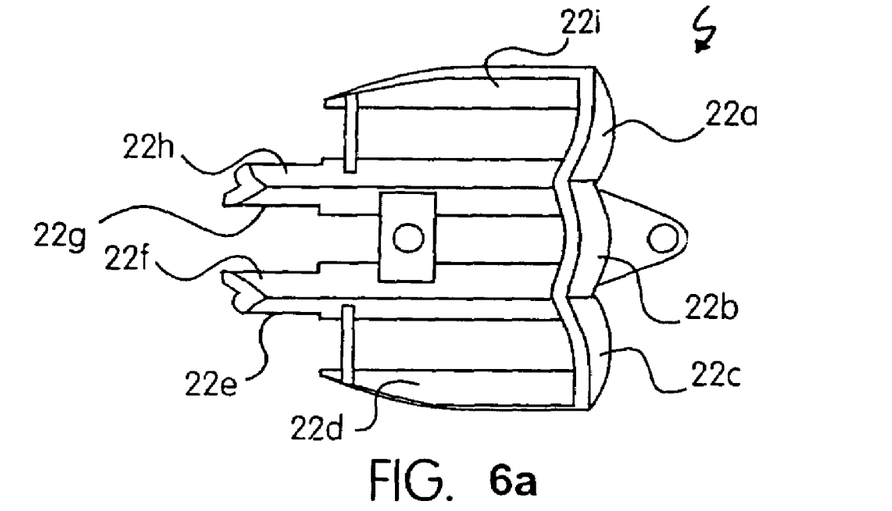
FIG. 6a is a top perspective view of one embodiment of a light directing member for a side turn/marker lamp mounted on the curbside of a truck.
Figure 6B:
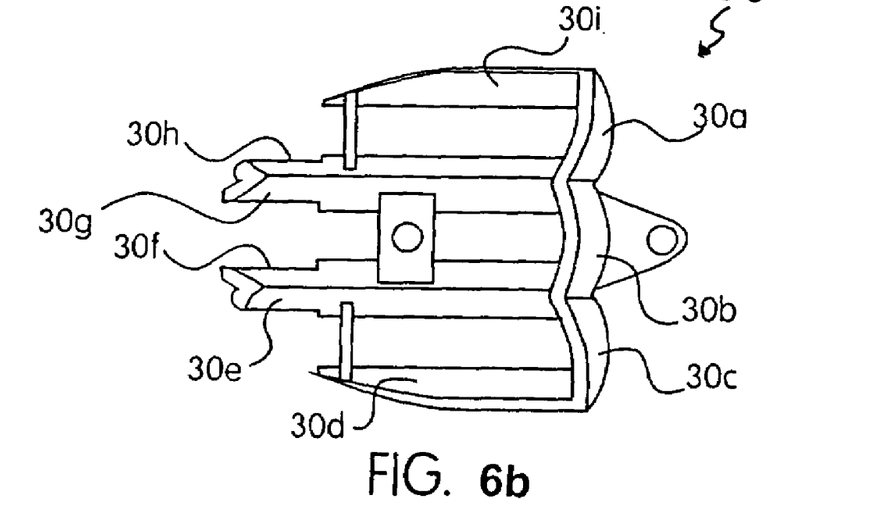
FIG. 6b is a top perspective view of one embodiment of a light directing member for a side turn/marker lamp mounted on the roadside of a truck.

FIG. 6a shows the top perspective view of one embodiment of light directing member 22, as found in lamp 10. In this embodiment, lamp 10 is mounted on the curbside of a vehicle (not shown). Accordingly, light directing member 22 is a curbside light directing member. FIG. 6b shows a top perspective view of one embodiment of light directing member 30 used in a side turn lamp (not shown here) that is mounted on the roadside of a vehicle. Accordingly, light directing member 30 is a roadside light directing member. One of ordinary skill in the art will readily appreciate that light directing member 30 is the mirror image of light directing member 22.

In the embodiment shown, light directing members 22 and 30 are constructed of metalized polycarbonate. In alternative embodiments, one of ordinary skill in the art will readily appreciate that the curbside and roadside light directing members could be constructed of a naturally reflective material, or could be coated with other reflective materials, such as white or silver paint, to achieve the same reflective properties as light directing members 22 and 30.

In the embodiment depicted in FIG. 6a, light directing member 22 comprises three substantially vertical reflective elements 22a, 22b, and 22c. With respect to reflective elements 22a–c, the surfaces facing toward LEDs 17 (not visible) function to reflect light emitted from LEDs 17 (see FIG. 9). Light directing member 22 further comprises six horizontal reflective elements 22d, 22e, 22f, 22g, 22h, and 22i. All nine reflective elements, 22a–22c and 22d–22i are parabolic extruded surfaces. Referring again to FIG. 5, the angle between reflective elements 22a–22c and reflective elements 22d–i is $\alpha_1$. In the embodiment shown, $\alpha_1$ is approximately eighty (80) degrees. Because reflective elements 22d–22i are arranged parallel to base 121 of housing 12, it follows that the angle between base 121 and reflective elements 22a–22c is also approximately eighty degrees.

Similarly, light directing member 30, as depicted in FIG. 6b, is comprised of three substantially vertical reflective elements 30a, 30b, and 30c, as well as six horizontal reflective elements 30d, 30e, 30f, 30g, 30h, and 30i. All nine reflective elements, 30a–30c and 30d–30i are parabolic extruded surfaces. Again, with respect to reflective elements 30a–30c, the surfaces facing toward LEDs 17 (not shown here) function to reflect light emitted from LEDs 17. Vertical reflective elements 30a–30c are at an angle $\alpha_1$ to horizontal reflective elements 30d–30i, $\alpha_1$ being approximately eighty (80) degrees. Because reflective elements 30d–30i are arranged parallel to base 121 of housing 12, it follows that the angle between base 121 and reflective elements 30a–30c is also approximately eighty degrees.

With respect to both light directing member 22 and light directing member 30, one of ordinary skill in the art will readily appreciate that the light directing member can function to redirect light even if the angle between the substantially vertical reflective elements and the horizontal reflective elements is changed. Moreover, one of ordinary skill in the art will readily appreciate that the reflective surfaces could assume many geometrical shapes and still function to redirect light emitted from the LEDs. Additionally, one of ordinary skill in the art will further appreciate that different numbers of reflective surfaces could be used to redirect light emitted from the LEDs.

In the embodiment shown herein, the nine reflective surfaces 22a–22i, 30a–30i comprising light directing members 22 and 30 were constructed using a Non-Uniform Rational B-Splines (NURBS) CAD modeling program, Rhinoceros 2.0 (McNeel Associates, 2001). The photometric effect of each of the reflective surfaces was determined using an optic analysis program, Advanced Systems Analysis Program 7.0.6 (Breaut Research Organization, 2001). The final surface information then was modeled into a solid, adding thickness and additional mechanical details, using Unigraphics 16.0.4, a geometric, parasolid modeler that supports solid modeling.

In an alternative embodiment, light directing members 20, 30 do not include the horizontal reflective elements 22d–22i and 30d–30i, respectively, only substantially vertical reflective elements 22a–22c and 30a–30c, respectively. In the embodiments shown, light directing members 20, 30 perform the function of redirecting light emitted by LEDs 17 by using only vertical reflective elements 22a–22c and 30a–30c, respectively. This alternative embodiment is constructed in the same manner as described above. An additional alternative embodiment of light directing members 20, 30 utilizes segmented reflectors to perform the function of redirecting light. This alternate embodiment is constructed using ReflectorCAD 1.5 (Breault Research Organization, 2001).

Figure 7:
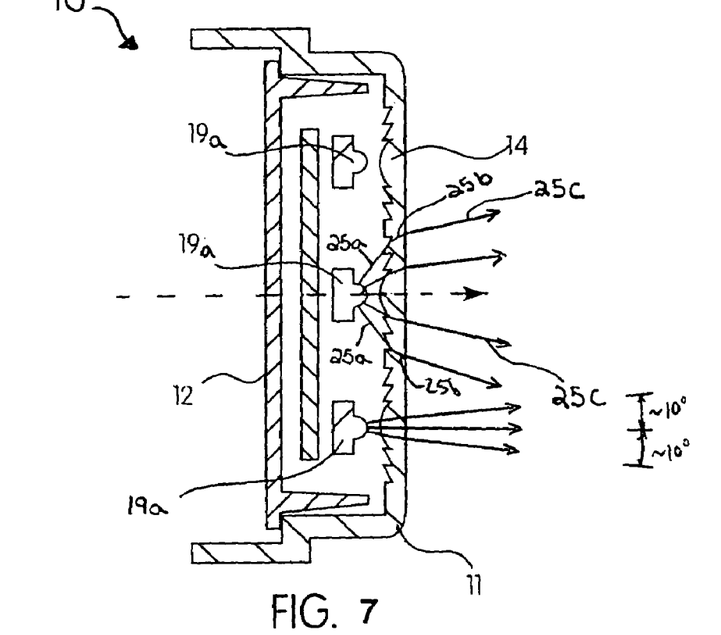
FIG. 7 is a vertical cross section of one embodiment of the side turn/marker lamp illustrating the manner in which the Fresnel rings distribute light.

FIG. 7 is a vertical cross section of one embodiment of lamp 10 along line B of FIG. 4b. FIG. 7 illustrates a schematic representation of the manner in which light, emitted from LEDs 19a disposed directly under each of Fresnel rings 14, is distributed by Fresnel rings 14 when lamp 10 is mounted on a vehicle (not shown). As shown in FIG. 7, in this embodiment, Fresnel rings 14 are integrally formed on the inside surface of lens 11. Light rays 25a emitted from LEDs 19a impinge on the inside surface of Fresnel rings 14 and are refracted to form light rays 25b. Light rays 25b travel through lens 11 and impinge on the outside surface of lens 11 and are refracted to form light rays 25c. In this way, Fresnel rings 14 function to collimate the light emitted from each of the three LEDs 19a and provide a uniform light distribution in a circular pattern around the center of lamp 10. More specifically, Fresnel rings 14 distribute the light emitted from LEDs 19a approximately ten (10) degrees above and below axis of symmetry A and approximately ten (10) degrees left and right of LEDs 19a (along axis of symmetry A).

Figure 8:
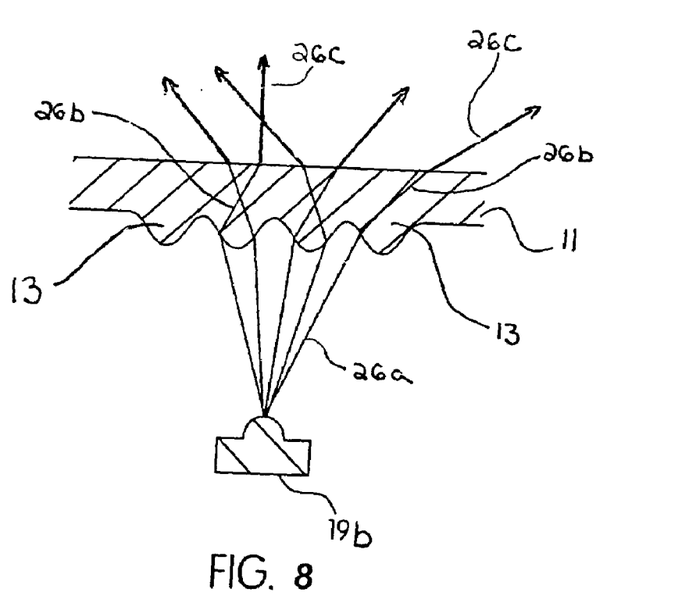
FIG. 8 is a ray diagram depicting the path the light emitted from the LED takes when it impinges on one embodiment of the wedge optics.

FIG. 8 illustrates a blown-up schematic representation of the manner in which light emitted from LEDs 19a–b is distributed by one embodiment of wedge optics 13. As shown in FIG. 8, in this embodiment, wedge optics 13 are integrally formed on the inside surface of lens 11. Light rays 26a emitted from LEDs 19a–b impinge on the inside surface of wedge optics 13 and are refracted to form light rays 26b. Light rays 26b travel through lens 11 and impinge on the outside surface of lens 11 and are refracted to form light rays 26c. In this manner, wedge optics 13 function to distribute the light emitted from LEDs 19a–b at approximately forty-five (45) degrees left and right to allow lamp 10 to satisfy marker lamp functions.

Figure 9:
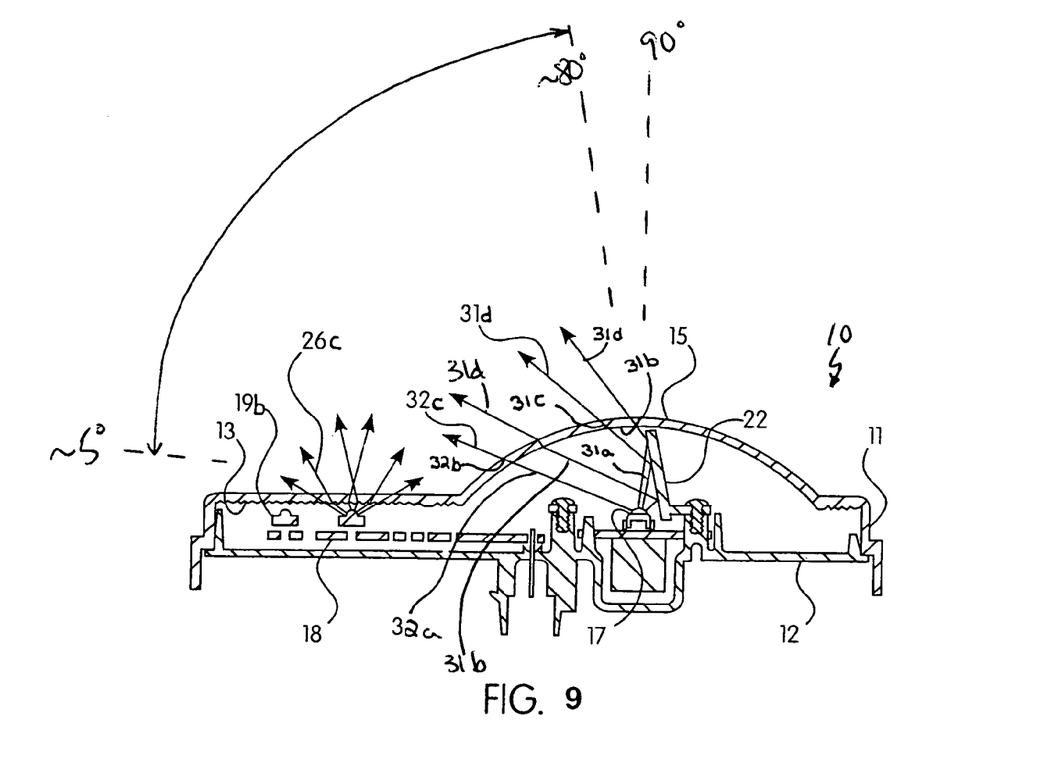
FIG. 9 is a horizontal cross-sectional view of one embodiment of a combined side turn/marker lamp, illustrating the manner in which one embodiment of the wedge optics and light directing member distribute light.

FIG. 9 is a cross-sectional view of one embodiment of side turn/marker lamp 10 in which the manner in which light directing member 22 reflects and redirects a portion of the light emitted from LEDs 17 as indirect light rays is illustrated. More specifically, as shown in FIG. 9, light rays 31a emitted from LEDs 17 contact the inside surface of vertical reflective surfaces 22a–c and are reflected to form indirect light rays 31b. Indirect light rays 31b then impinge upon the inside surface of convex lens 15 and are refracted to form light rays 31c. Finally, light rays 31c travel through convex lens 15, impinge upon the outside surface of convex lens 15 and are refracted to form light rays 31d. FIG. 9 further illustrates that the portion of the light emitted from LEDs 17 that does not contact light directing member 22 and is projected outward as direct light. More specifically, light rays 32a emitted from LEDs 17 are projected outward toward convex lens 15. Direct light rays 32a impinge upon the inside surface of convex lens 15 and are refracted to form light rays 32b. Finally, light rays 32b travel through convex portion 15, impinge upon the outside surface of convex portion 15 and are refracted to form light rays 32c. In this way, light directing member 22 functions to project the light emitted from LEDs 17 to back portion 12b of lamp 10. In this embodiment, the light distribution pattern spans approximately five (5) degrees to approximately ninety (90) degrees, in one direction along the longitudinal axis of lamp 10. Finally, FIG. 9 also illustrates the manner in which light emitted from LEDs 19b is distributed by wedge optics 13 to form light rays 26c as described in detail supra with respect to FIG. 8.

Figure 10A:
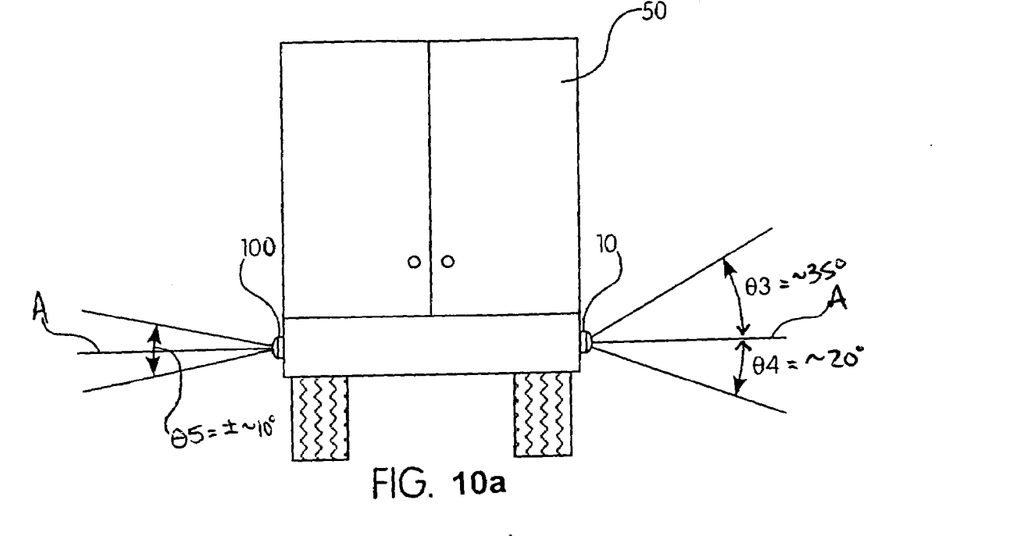
FIG. 10a is a rear end view of how light is distributed vertically by one embodiment of the side turn/marker lamp when it is mounted on the side of a truck.

FIG. 10a is a rear end view of how light is distributed vertically by one embodiment of lamp 10, a curbside side turn/marker lamp, when lamp 10 is mounted on the curbside side of vehicle 50. FIG. 10a also illustrates how light is distributed vertically by lamp 100, an alternate embodiment of a roadside side turn/marker lamp, when lamp 100 is mounted on the roadside side of vehicle 50. In the embodiment shown here, the Fresnel rings (not shown) collimate the light emitted by the low flux LEDs (not shown) and provide a uniform light distribution $\theta_5$ above and below axis of symmetry A (as shown in FIGS. 4a–4b) of lamp 10 and lamp 100. As discussed above, $\theta_5$ is approximately twenty (20) degrees (10 degrees above and below axis of symmetry A). One of ordinary skill in the art will further appreciate that other types of collimating optics that can provide a uniform light distribution above and below axis of symmetry A of lamp 10 (or lamp 100) could be used.

Figure 10B:
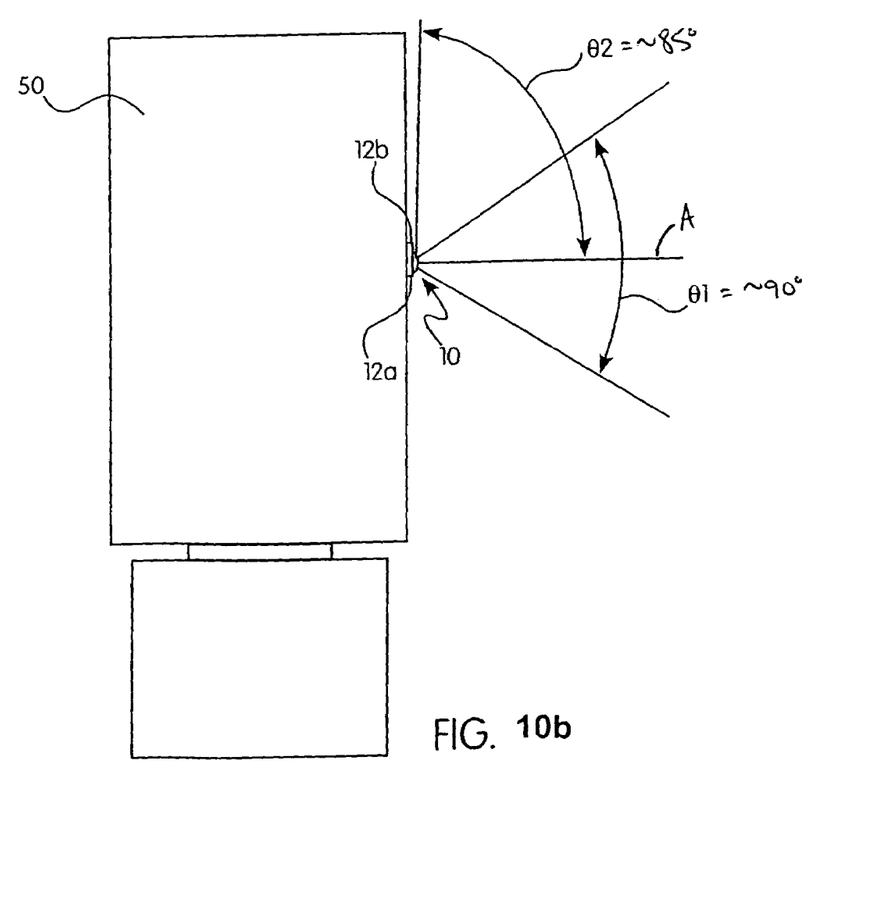
FIG. 10b is a top view of how light is distributed horizontally by one embodiment of the side turn/marker lamp when it is mounted on the side of a truck.

FIG. 10b is a top view of how light is distributed horizontally by one embodiment of lamp 10 when lamp 10 is mounted on the roadside side of vehicle 50. FIG. 10b illustrates the distribution pattern that results when the light emitted from the low flux LEDs (not shown) impinges on the wedge optics (not shown). The light is fanned outward along axis of symmetry A of lamp 10 at an angle $\theta_1$ that is approximately forty-five (45) degrees toward front portion 12a and approximately forty-five (45) degrees toward back portion 12b. One of ordinary skill in the art will appreciate that different types of optics, which are capable of spreading light in a manner similar to wedges optics 13, could be used in other embodiments of the combined side turn/marker lamp.

Referring still to FIG. 10b, the light directing member (not shown) redirects the light and causes the light emitted from the high flux LEDs (not shown) to be projected at an angle $\theta_2$ that is approximately five (5) degrees to approximately ninety (90) degrees along the horizontal plane toward back portion 12b of housing 12 and rearward of vehicle 50. Additionally, referring again to FIG. 10a, the light directing member causes the light emitted from the high light flux LEDs to be projected at an angle $\theta_3$ that is approximately 35 degrees above axis of symmetry A and at an angle $\theta_4$ that is approximately twenty degrees below axis of symmetry A.

In effect, as shown in FIGS. 10a–10b, the combination of the Fresnel rings and the light directing member projects light toward the rear of vehicle 50 and into a side-turn pattern. Moreover, the distribution pattern generated by the Fresnel rings and the wedge optics allows for lamp 10 to perform the side marker function pursuant to the SAE J592 Standard for marker lamps.

Figure 11:
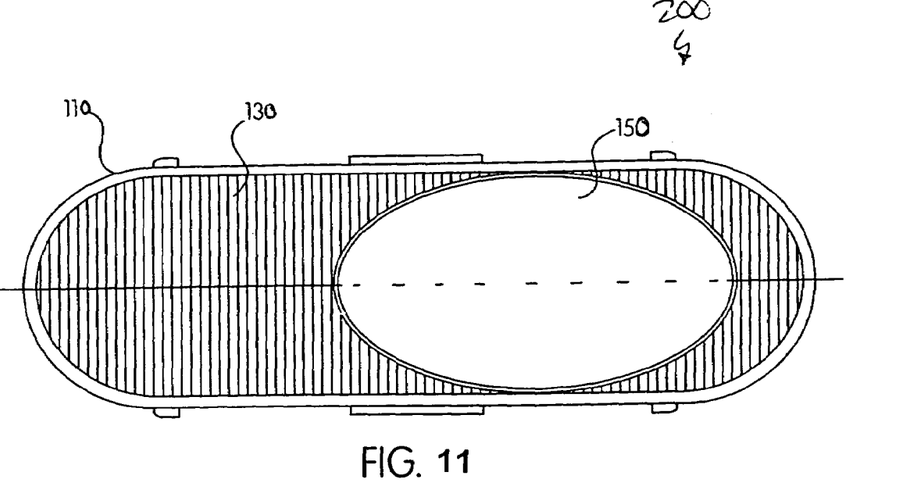
FIG. 11 is top plan view of an alternative embodiment with different optics in the lens.

A person of ordinary skill in the art will readily appreciate that changing the number and arrangement of LEDs could eliminate the need for all or some of the optics in the lens, require additional optics, or require the optics to be placed elsewhere in order for the combined side turn/marker lamp to meet the J592 standard pertaining to side marker lamps. For example, FIG. 11 illustrates a top plan view of lamp 200, an alternative embodiment of the side turn/marker lamp, in which lens 110 comprises convex lens 150 and wedge prism optics 130, but does not include any Fresnel ring optics.

Figure 12A:
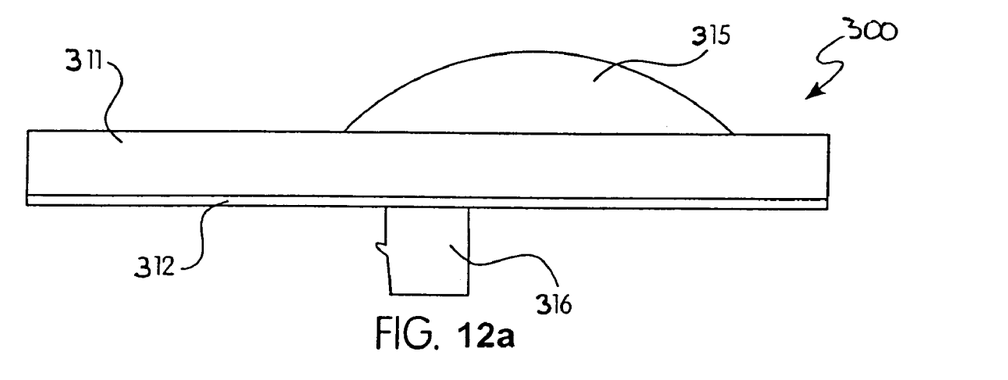
FIG. 12a is a cross sectional view of an alternative embodiment of the side turn/marker lamp with a rectangular shape.
Figure 12B:
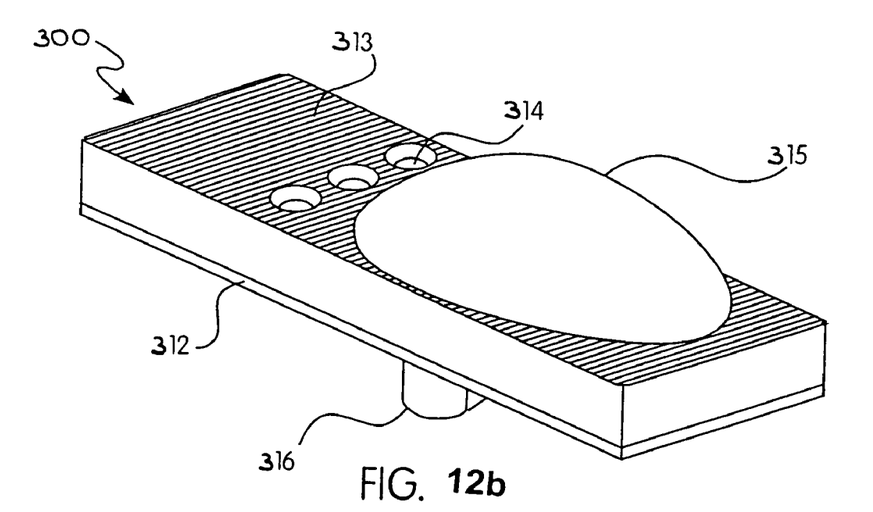

Moreover, as illustrated in FIGS. 1–4, lens 11 and housing 12 are substantially oval-shaped to allow lamp 10 to function as one type of side turn/marker vehicular lamp. In an alternative embodiment shown in FIGS. 12a and 12b, lamp 300 is shown to include lens 311, housing 312, wedge prisms 313, and power input module 316. In this embodiment, lens 311 and housing 312 are substantially rectangular to comprise a second type of side turn/marker vehicular lamp. Similar to lamp 10, lens 311 is shown to include Fresnel rings 314, convex portion 315 and wedge optics 315. As illustrated in FIGS. 12a and 12b, one of ordinary skill in the art will readily appreciate that other housing and lens shapes can be utilized to construct a combined side turn/marker lamp without departing from the scope and spirit of the present invention.

The foregoing description of specific embodiments will so fully reveal the invention according to the conceptual point of view, that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

What is claimed is:

1. A device, comprising:
   a housing having a base;
   at least one planar substrate, each of said at least one planar substrate adapted to engage with said housing;
   a first plurality of light sources mounted on and supported by one of said at least one planar substrate;
   a second plurality of light sources mounted on and supported by one of said at least one planar substrate:
   a lens, said lens positioned adjacent to said first plurality of light sources and said second plurality of light sources; and
   a light directing member operatively secured to said housing and substantially under said lens, said light directing member directing light substantially in one direction along a longitudinal axis of said lamp, said light directing member comprised of a plurality of substantially vertical reflective elements, each corresponding to one of said first plurality of light sources and arranged within said lamp to reflect light emitted from said first plurality of light sources outward from said device and a plurality of substantially horizontal reflective elements, each also corresponding to one of said first plurality of light sources, said plurality of substantially vertical reflective elements arranged at an angle less than or substantially equal to ninety degrees relative to said plurality of substantially horizontal reflective elements.

2. The device of claim 1, wherein said light directing member further produces a light distribution pattern spanning approximately 35 degrees above a longitudinal axis of said device and substantially 20 degrees below said longitudinal axis of said lamp.

3. The device of claim 1, wherein said at least one planar substrate is disposed substantially parallel to said base.

4. The device of claim 1, wherein each of said plurality of reflective elements of said light distribution member is operatively disposed at an angle approximately eighty degrees from said base.

5. The device of claim 1, wherein each of said plurality of reflective elements of said light distribution member is generally parabolic in shape.

6. The device of claim 1 wherein each of said substantially horizontal reflective elements of said light directing member is generally parabolic in shape.

7. The device of claim 1, wherein each of said first plurality of light sources and each of said second plurality of light sources are a light emitting diode.

8. The device of claim 1, wherein each of said at least one planar substrate is a circuit board.

9. The device of claim 1, wherein said first plurality of light sources is comprised of three high-flux light emitting diodes capable of emitting a minimum flux of approximately 10 Lumens, and wherein said second plurality of light sources is comprised of eight low-flux light emitting diodes capable of emitting a minimum flux of approximately 0.1 Lumens.

10. The device of claim 1, wherein said lens further comprises a plurality of wedge optics.

11. The lamp of claim 1, wherein said lens further comprises a plurality of Fresnel rings, each of said plurality of Fresnel rings corresponding to one of said first plurality of light sources.

12. A lamp, comprising:
   a housing, said housing comprised of a base;
   a first plurality of light sources;
   a first substantially planar substrate adapted to engage with said housing and disposed substantially parallel to said base, said first planar substrate supporting said first plurality of light sources;
   a second plurality of light sources;
   a second substantially planar substrate adapted to engage with said housing and disposed substantially parallel to said base, said second planar substrate supporting said second plurality of light sources;
   a light directing member secured to said base, said light directing member directing light emitted from said first plurality of light sources outward from said lamp in a light distribution pattern spanning approximately five degrees to approximately ninety degrees substantially in a rearward direction along a longitudinal axis of said lamp, said light directing member comprised of a plurality of substantially vertical reflective elements, each of said plurality of substantially vertical reflective elements corresponding to one of said first plurality of light sources and arranged within said lamp, and a plurality of substantially horizontal reflective elements, each of said plurality of substantially horizontal reflective elements also corresponding to one of said first plurality of light sources, said plurality of substantially vertical reflective elements arranged at an angle less than or substantially equal to ninety degrees relative to said plurality of substantially horizontal reflective elements; and
   a lens, said lens positioned adjacent to and substantially covering said first plurality of light sources, said second plurality of light sources, said first planar substrate, said second planar substrate, and said light directing member.

13. The lamp of claim 12, wherein each of said plurality of substantially horizontal reflective elements of said light directing member is generally parabolic in shape.

14. The lamp of claim 12, wherein each of said first plurality of light sources is a high-flux light emitting diode capable of emitting a minimum flux of approximately 10 Lumens, and wherein each of said second plurality of light sources is a low-flux light emitting diode capable of emitting a minimum flux of approximately 0.1 Lumens.

15. The lamp of claim 12, wherein said first plurality of light sources comprises three light sources arranged substantially in a row, and wherein said second plurality of light sources comprises eight light sources arranged generally in a rectangle.

16. The lamp of claim 12, wherein said lens further comprises a plurality of wedge optics.

17. The lamp of claim 12, wherein said lens further comprises a plurality of Fresnel rings, each of said plurality of Fresnel rings corresponding to one of said first plurality of light sources.

18. A combined side turn/marker lamp, comprising:
a housing, said housing having a base;
a first planar substrate, said first planar substrate adapted to engage with said housing;
a second planar substrate, said first planar substrate adapted to engage with said housing;
a first plurality of LEDs disposed on said first planar substrate;
a second plurality of LEDs disposed on said second planar substrate:
a light directing member operatively secured to said housing and substantially under a lens, said light directing member comprised of a first plurality reflective elements and a second plurality of reflective elements, wherein said first plurality of reflective elements are disposed substantially vertical relative to said base, each of said first plurality of reflective elements corresponding to one of said first plurality of LEDS, and arranged within said lamp to reflect light emitted from said first plurality of light sources, and wherein each of said second plurality of reflective surfaces corresponds to one of said first plurality of light sources and extending substantially parallel to said base, and also arranged within said lamp to reflect light emitted from said first plurality of light sources, wherein said light directing member produces a light distribution pattern spanning approximately five degrees to approximately ninety degrees in a rearward direction along a longitudinal axis of said lamp; and
said lens positioned adjacent to said plurality of light sources and having a plurality of Fresnel rings and a plurality of wedge optics, each of said plurality of Fresnel rings corresponding to one of said first plurality of LEDs, and said plurality of wedge optics to direct light in both said rearward direction and in a forward direction.

19. The lamp of claim 18, wherein said light directing member also produces a light distribution pattern spanning approximately thirty five degrees above a longitudinal axis of said lamp and substantially twenty degrees below said longitudinal axis of said lamp.

20. The lamp of claim 18, wherein said first planar substrate and said second planar substrate are disposed substantially parallel to said base.

21. The lamp device of claim 18, wherein each of said first plurality of reflective elements of said light distribution member is operatively disposed at an angle approximately eighty degrees from said base.

22. The lamp of claim 18, wherein each of said first plurality of reflective elements and said second plurality of reflective elements of said light distribution member are substantially parabolic in shape.

23. The lamp of claim 18, wherein said first planar substrate and said second planar substrate are each a circuit board.

24. The lamp of claim 18, wherein said first plurality of LEDs are comprised of three high-flux LEDs capable of emitting a minimum flux of approximately 10 Lumens, and wherein said second plurality of LEDs is comprised of eight low-flux light emitting diodes capable of emitting a minimum flux of approximately 0.1 Lumens.

* * * * *